US010482557B2

(12) United States Patent
Bergstrom et al.

(10) Patent No.: US 10,482,557 B2
(45) Date of Patent: Nov. 19, 2019

(54) ANNUITY INTERFACE AND SYSTEM IN AN INTELLECTUAL PROPERTY DATABASE (75) Inventors: Andrew Bergstrom, Minneapolis, MN (US); Nigel Gay, St. Philip's (CA)

(73) Assignee: FoundationIP, LLC, Minneapolis, MN (US)

( * ) Notice: Subject to any disclaimer, the term of this patent is extended or adjusted under 35 U.S.C. 154(b) by 770 days.

(21) Appl. No.: 12/333,564

(22) Filed: Dec. 12, 2008

(65) Prior Publication Data

US 2010/0153264 A1 Jun. 17, 2010

(51) Int. Cl.
*G06Q 50/26* (2012.01)
*G06Q 10/06* (2012.01)
*G06Q 20/10* (2012.01)
*G06Q 40/00* (2012.01)

(52) U.S. Cl.
CPC ............ *G06Q 50/26* (2013.01); *G06Q 10/06* (2013.01); *G06Q 20/102* (2013.01); *G06Q 40/00* (2013.01)

(58) Field of Classification Search
CPC .................................................... G06Q 50/184
USPC .................................................. 705/35, 36 R
See application file for complete search history.

(56) References Cited

U.S. PATENT DOCUMENTS

| 2002/0156798 | A1* | 10/2002 | Larue et al. ............... 707/201 |
| 2004/0064484 | A1 | 4/2004 | Polan et al. |
| 2004/0249788 | A1 | 12/2004 | Dant |
| 2005/0154673 | A1 | 7/2005 | Fellenstein et al. |
| 2005/0228693 | A1 | 10/2005 | Webb et al. |
| 2005/0234928 | A1 | 10/2005 | Shkvarchuk et al. |
| 2006/0080135 | A1* | 4/2006 | Frank et al. ............... 705/1 |
| 2007/0239600 | A1 | 10/2007 | Lundberg et al. |

FOREIGN PATENT DOCUMENTS

| JP | 2006-512695 A | 4/2006 |
| JP | 2006-523341 A | 10/2006 |
| JP | 2008-117005 A | 5/2008 |
| KR | 2002-0084989 A | 11/2002 |
| KR | 20020084989 A | 11/2002 |
| KR | 2003-0029566 A | 4/2003 |
| WO | 2004/059443 A2 | 7/2004 |
| WO | 2004/084098 A2 | 9/2004 |
| WO | 2004084098 A2 | 9/2004 |
| WO | 2007/148437 A1 | 12/2007 |

(Continued)

OTHER PUBLICATIONS

Extended European Search Report Received for EP Patent Application No. 08878813.8, dated Sep. 11, 2012, 6 pages.

(Continued)

*Primary Examiner* — Cho Kwong
(74) *Attorney, Agent, or Firm* — Fiala & Weaver P.L.L.C.

(57) ABSTRACT

A method and system for integrating management of intellectual property assets with management of annuity instructions for patent grants and pending patent applications. An intellectual property asset management application is integrated with an asset management application through a third application. Communication conduits are configured in communication with the applications in the form of queues and schedulers to facilitate communicating instructions among the applications. Web services are employed as a communication medium to send instructions among the applications.

19 Claims, 8 Drawing Sheets

(56) References Cited

FOREIGN PATENT DOCUMENTS

WO    2010/068217 A2    6/2010

OTHER PUBLICATIONS

International Preliminary Report on Patentability received for PCT Patent Application No. PCT/US08/86544, dated Sep. 30, 2011, 6 pages.
International Search Report and Written Opinion received for PCT Patent Application No. PCT/US08/86544, dated Feb. 1, 2011, 9 pages.
Office Action Received for Chinese Patent Application No. 200880132697.0, dated Aug. 13, 2013, 7 pages of Chinese Office action and 6 pages of English translation.
Office Action Received for Chinese Patent Application No. 200880132697.0, dated Dec. 19, 2012, 8 pages of Chinese Office action and 10 pages of English translation.
Office Action Received for Chinese Patent Application No. 200880132697.0, dated Jan. 16, 2014, 8 pages of Chinese Office action.
Office Action Received for Japanese Patent Application No. 2011-540672, dated Mar. 19, 2013, 3 pages of Japanese Office action and 2 Pages of English translation.
Office Action Received for Korean Patent Application No. 10-2011-7015904, dated May 30, 2014, 6 pages of Korean Office action and 10 Pages of English translation.
Office Action received for European Patent Application No. 08878813.8, dated Dec. 18, 2014, 6 Pages.
Notice of Allowance received for Korean Patent Application No. 10-2011-7015904, dated Nov. 18, 2014, 2 page of original office action and 8 pages of English translation.
Office Action received for Canadian Patent Application No. 2,746,748, dated May 7, 2015, 9 Pages.
Notification of Re-examination received for China Patent Application No. 200880132697.0, dated Jan. 20, 2016, 8 pages.
First Examiner Report Received for Australia Patent Application No. 2008364969, dated Oct. 3, 2014, 3 Pages.

\* cited by examiner (PRIOR ART)
FIG. 1

ANNUITY INTERFACE AND SYSTEM IN AN INTELLECTUAL PROPERTY DATABASE

BACKGROUND OF THE INVENTION

Technical Field

This invention relates to an interface between two applications through a web service. More specifically, the invention relates to interfacing an annuity application with an asset management application.

Description of the Prior Art

A patent is an exclusive right granted by a government to an inventor to manufacture, use, or sell an invention for a limited number of years. The basis for the grant is the disclosure of the invention. All granted utility patents, and many industrial design patents, are subject to periodic maintenance fees in order to maintain the grant itself. In the United States, the maintenance fees for utility patents are not annual fees, and currently there are no maintenance fees required for design patents. However, in most other countries, the utility patents are subject to annual fees, also known as renewal fees. Such renewals are required even while the patent has a pending status, prior to issuance of the grant itself.

As a patent portfolio expands, so does the complexity of managing the due dates and payments of the annual fees. There are services available to assist with managing these assets to ensure that deadlines are not missed, and also to reduce the costs associated with management and payment of the periodic maintenance fees.

Another aspect of management of intellectual property assets pertains to management of pending applications and invention disclosures. Different tools are available for the management, all of which employ some form of a calendar to note deadlines and to inform agents and attorneys of such deadline. Computer based applications have been developed to employ such management in an electronic environment. As technology has evolved, so have the management applications, which are now available in a web based format accessible through commonly available browser applications.

However, the management of intellectual property assets and management of periodic maintenance fees have for the most part remained separated. In other words, such applications have not been integrated such that the management application may also track deadlines associated with the periodic maintenance fee(s). Therefore, it is desirable to employ technological advancements to enhance the management of intellectual property assets including communication of data between the management application(s) and an asset management service.

SUMMARY OF THE INVENTION

This invention comprises a transparent interface between an annuity management system and an asset management system.

In one aspect of the invention, a computer system method is provided with a first computer having a first processor in communication with a first memory module, and a first application in communication with the first processor. The first application is directed to docketing of intellectual property assets. A second computer is provided with a second processor in communication with a second memory module and data storage, and a second application in communication with the second processor. The second application is directed to management of annuity data for intellectual property assets. A manager is provided local to the first computer and in communication with the first application via local communication protocol and in communication with the second application via a web service. The manager synchronizes data between the annuity and asset management systems via the manager and the web service.

In another aspect of the invention, a method is provided for interfacing annuity data processing with management of intellectual property assets. A first application directed to docketing of intellectual property assets is provided, and a second application directed to management of annuity data for intellectual property assets is provided. The second application is in communication with the first application. A manager is provided for interfacing with the first and second applications via a web service to synchronize annuity data of the second application with the intellectual property assets of the first application via the web service.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as an application(s) and/or a manager(s). Either of these functional units may be implemented in programmable hardware devices such as field programmable gate arrays, programmable array logic, programmable logic devices, or the like. The functional units may also be implemented in software for execution by various types of processors. An identified functional unit of executable code may, for instance, comprise one or more physical or logical blocks of computer instructions which may, for instance, be organized as an object, procedure, function, or other construct. Nevertheless, the executables of an identified manager and/or application need not be physically located together, but may comprise disparate instructions stored in different locations which, when joined logically together, comprise the functional unit and achieve the stated purpose thereof.

Indeed, a manager or functional unit of executable code could be a single instruction, or many instructions, and may even be distributed over several different code segments, among different applications, and across several memory devices. Similarly, operational data may be identified and illustrated herein within the manager and/or application, and may be embodied in any suitable form and organized within any suitable type of data structure. The operational data may be collected as a single data set, or may be distributed over different locations, including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of managers, applications, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

Integration of a patent annuity management system with a patent asset management system is enabled through a third application. In one embodiment, the third application operates local to a server running the asset management application. The third application serves as a conduit between the patent annuity system and the asset management system synchronizing data in the asset management system with annuity data maintained by the annuity management system. The third application communicates annuity payment information to the asset management system. Thus, the users are enabled to make payment decisions through the asset management system, including sending instructions electronically to the annuity management system, and maintaining a record of all instructions for a given renewal.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

Figure 1:
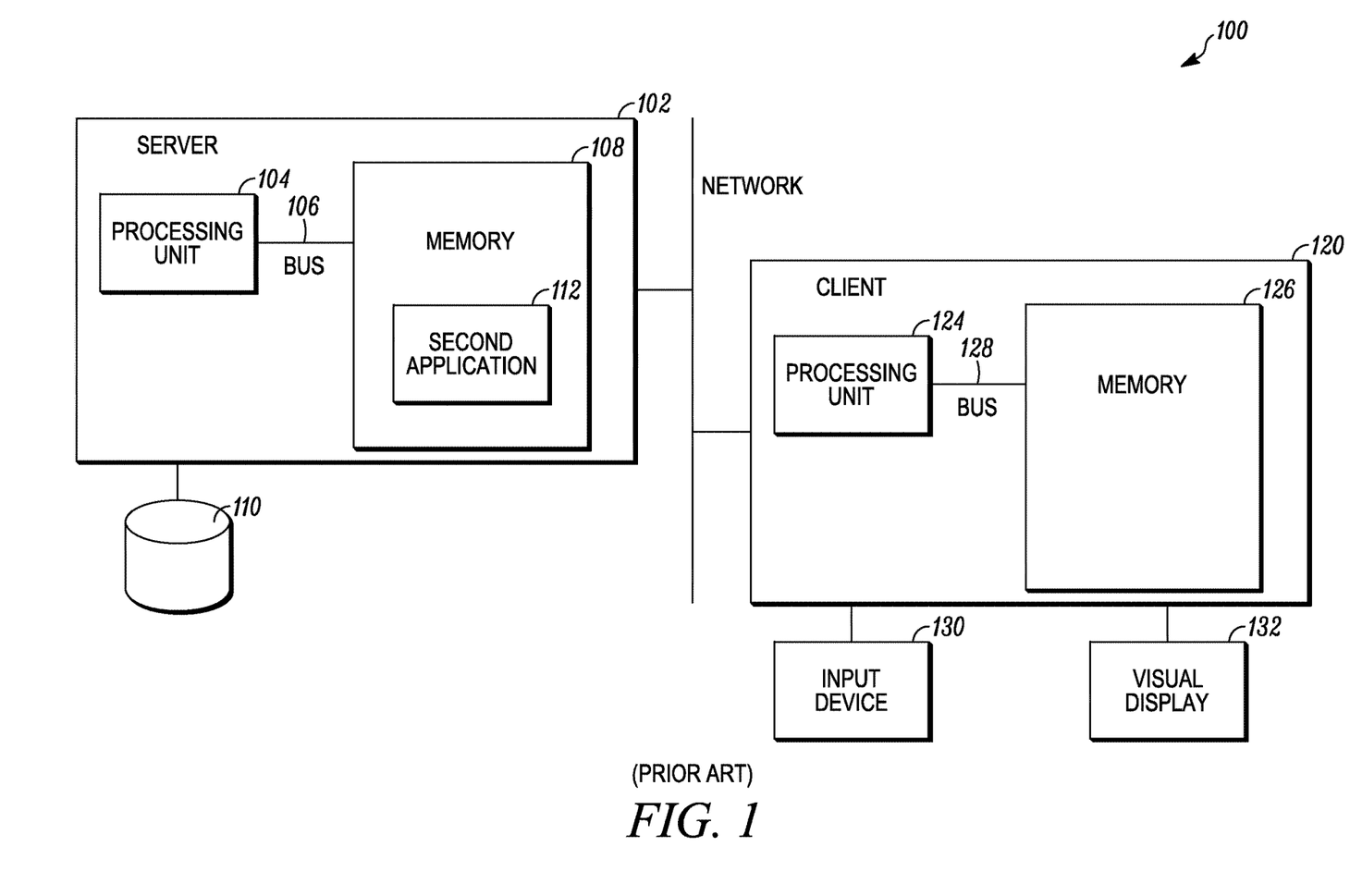
FIG. 1 is a prior art block diagram illustrating a client in communication with a server running an annuity management application.

FIG. 1 is a prior art block diagram (100) of a computer system provided with a patent annuity system. The patent annuity system manages the entire annuity process, from decision making to cost allocations. As shown, a server (102) is provided with a processing unit (104), also referred to herein as a processor, in communication with memory (108) across a bus (106). The server (102) is shown in communication with a data storage medium (110) employed to store patent maintenance fee information. A second application (112) is provided local to the server (102) and in communication with the processing unit (104). The second application (112) serves as an interface for managing maintenance fee information stored in the storage medium (110). In one embodiment, a client machine (120) is provided in communication with the server (102). The client machine (120) has a processing unit (124) in communication with memory (128) across a bus (126). Additionally, the client machine (120) is provided with an input device (130) and a visual display (132). The client machine (120) communicates with the server (102), and more specifically the second application (112), either through a local connection or across a network interface. Accordingly, patent maintenance fee information is retained local to a server and is accessible via a client machine in communication with the server.

Figure 2:
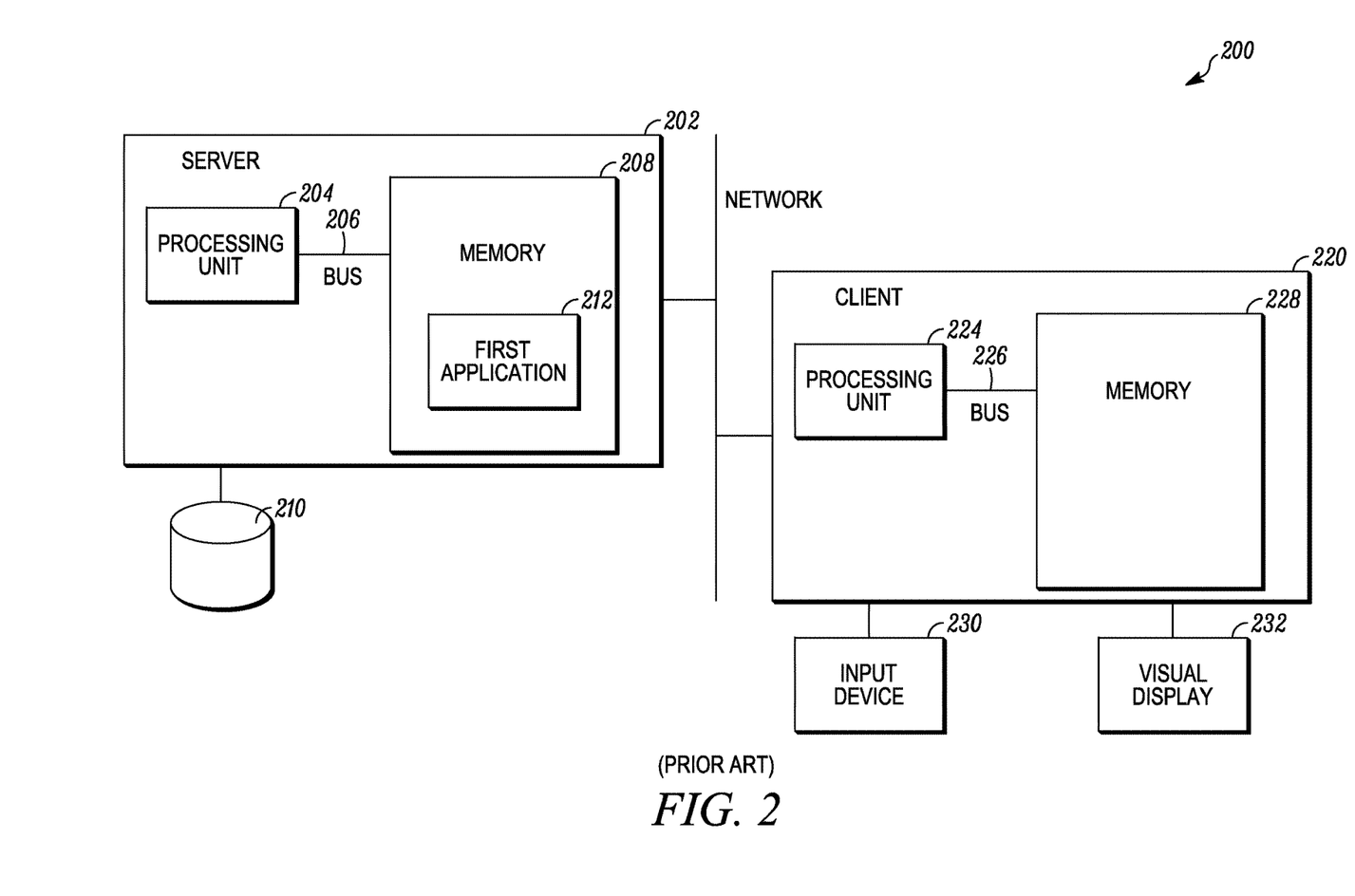
FIG. 2 is a prior art block diagram illustrating a client in communication with a server running an asset management application.

FIG. 2 is a prior art block diagram (200) of a computer system provided with an asset management system. The asset management system provides extensive management of active patents and pending patent applications. Users can view case history, documents, scanned copies of office actions, drafts, and invention disclosures, assignees, inventors, status of invention, date reminders, due dates and final dates for office actions, filings, etc. However, the asset management system does not allow users to determine an annuity payment amount or make a payment. As shown, a server (202) is provided with a processing unit (204), also referred to herein as a processor, in communication with memory (208) across a bus (206). The server (202) is shown in communication with a data storage medium (210) employed to store asset management data. A first application (212) is provided local to the server (202) and in communication with the processor (204). The application (212) serves as an interface for managing asset management data stored in the storage medium (210). In one embodiment, a client machine (220) is provided in communication with the server (202). The client machine (220) has a processing unit (224) in communication with memory (228) across a bus (226). Additionally, the client machine (220) is provided with an input device (230) and a visual display (232). The client machine (220) communicates with the server (202), and more specifically the first application (212), either through a local connection or across a network interface. Accordingly, asset management data is retained local to a server and is accessible via a client machine in communication with the server.

Figure 3:
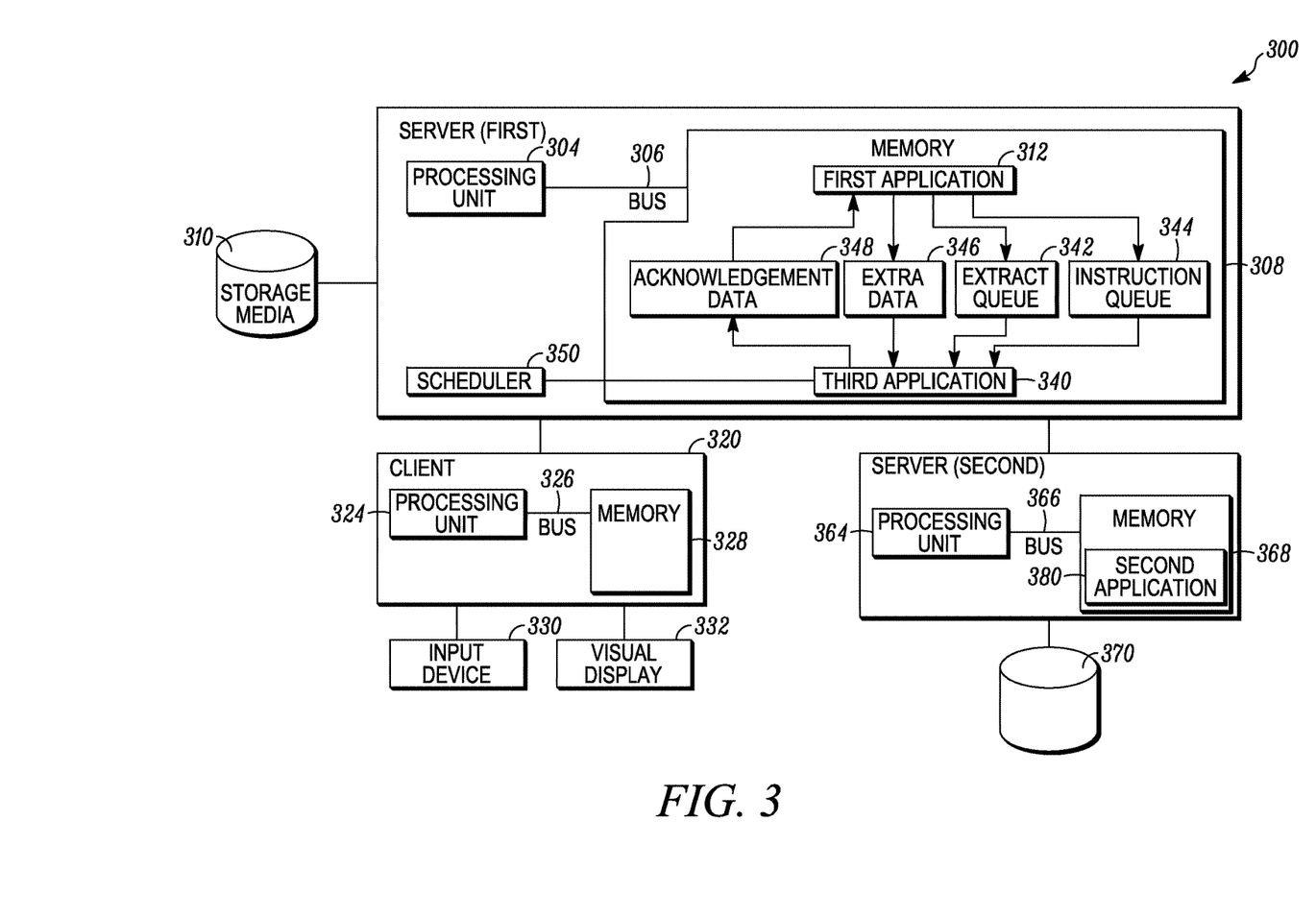
FIG. 3 is a block diagram illustrating a server running the annuity management application in communication with a server running the asset management application.

FIG. 1 and FIG. 2 illustrate a client that can separately access maintenance fee and asset management data. However, neither of the systems shown in FIG. 1 and FIG. 2 provides communication between the server managing maintenance fee information and the server responsible for asset management information. More specifically, each of the prior art systems individually address the asset management system or the patent annuity system as individual units, but do not include the hardware and/or software tools to integrate or otherwise share data between the two disparate systems. To facilitate the sharing of data, the system is modified to include additional elements. FIG. 3 is a block diagram (300) of a computer system that supports integration of the asset management system and the patent annuity system. As shown, a first server (302) is provided with a processing unit (304), also referred to herein as a processor, in communication with memory (308) across a bus (306). The server (302) is shown in communication with a data storage medium (310) employed to store asset management data. In one embodiment the data storage medium (310) may be located in a separate server. A first application (312) is provided local to the server (302) and in communication with the processor (304). The application (312) serves as an interface for managing asset management data stored in the storage medium (310). In one embodiment, a client machine (320) is provided in communication with the server (302). The client machine (320) has a processing unit (324) in communication with memory (328) across a bus (326). Additionally, the client machine (320) is provided with an input device (330) and a visual display (332). The client machine (320) communicates with the first server (302), and more specifically the application (312), either through a local connection or across a network interface.

A second server (360) is shown in communication with a data storage medium (370) that is employed to store maintenance fee data. As in the first server (302), the second server (360) has a processing unit (364) in communication with memory (368) across a bus (366). A second application (380) managing annuity data is provided local to the server (360). The second application (380) manages asset management data in the storage medium (370).

To facilitate communication between the patent annuity application (312) and the asset management application (380), a third application (340) is provided local to the first server (302). The third application (340) serves as a conduit between the patent annuity application and the asset management application. In addition to the third application (340), two queues (342) and (344) are provided to support the interface of the third application with the first application (312). The queues are in the form of an extraction queue (342) and an instruction queue (344). The extraction queue (342) is initiated by the first application (312) to communicate a request to the third application to extract data from the storage medium (370) in communication with the second application (380) local to the annuity system server (380). The extract request is a request for annuity payment information for a granted patent or pending patent application. Details of the extraction are illustrated below with a flow chart demonstrating the flow of extraction communication. The instruction queue (344) forwards a communication to the third application (340), with respect to authorization to submit payment for a maintenance fee of a managed asset. Details of the instruction queue are illustrated below with a flow chart demonstrating the flow of instruction communication. For each of the queues (342) and (344), data communication is uni-directional from the first application (312) to the third application (340). Accordingly, the first application (312) communicates with the third application (340) through the queues and the messages stored therein.

In addition, the first application (312) is enabled to communicate extract data (346) and payment instruction data to the third application (340). The third application (340) communicates acknowledgment data, instruction status, annuity events and renewal dates (348) to the first application.

As shown in FIG. 3, a third application (340) is provided as an interface between the first application (312) and the second application (380). The third application (340) is separate from the asset management application. More specifically, the third application (340) functions as an interface between the asset renewal service and the asset management service. There are four core elements that are supported by the third application (340), including: sending an extract job, receiving an acknowledgment job, sending an instruction job, and receiving a package job. Each of these four core elements are described below in FIGS. 4-7. To facilitate communication between the third application (340) and the asset management application (312), a scheduler (350) is employed. The scheduler (350) is a program that drives the third application (340). In one embodiment, the scheduler is an in-memory application that does not retain any knowledge of an action state between executions. Accordingly, a scheduler (350) is provided in communication with the third application (340) to support communication with the first application (312).

Figure 4:
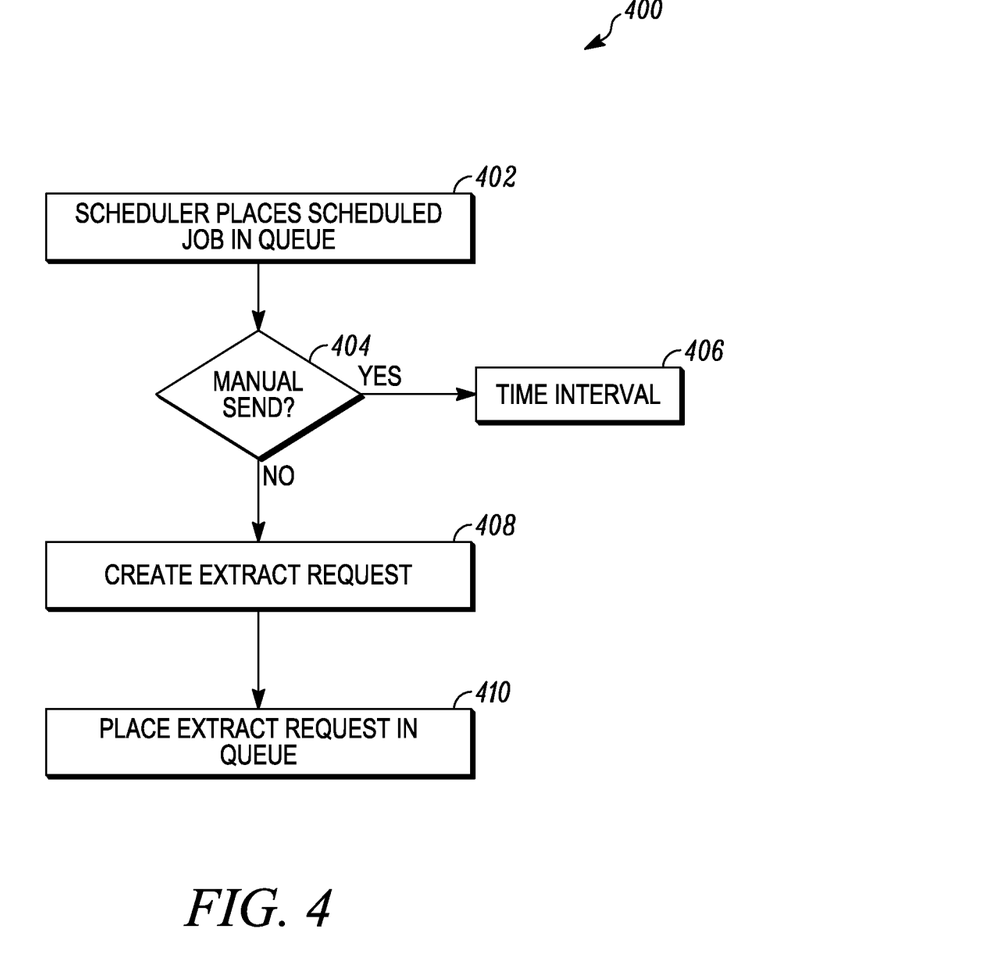
FIG. 4 is a flow chart illustrating initiation of an extract process in the asset management application.

As described above, there are four core elements that are supported by the third application. FIG. 4 is a flow chart (400) demonstrating the process of initiating an extract job from the first application to the third application. A scheduler is employed to prompt the first application to place any scheduled extraction jobs in the extraction queue (402). Following step (402) it is determined if the first application seeks to manually send one or more data extract jobs to the extract queue (404). A positive response is followed by elapse of a waiting period for the user to send the extract job(s) to the extract queue (406). Conversely, a negative response to the determination at step (404) or completion of step (406) is followed by the first application creating an extract request for annuity payment info pertaining to an active asset (408), and placing the extract request in the extract queue (410). Accordingly, the process of placing an extract job in the extract queue may be performed manually, or in an automated fashion without human involvement.

Figure 5:
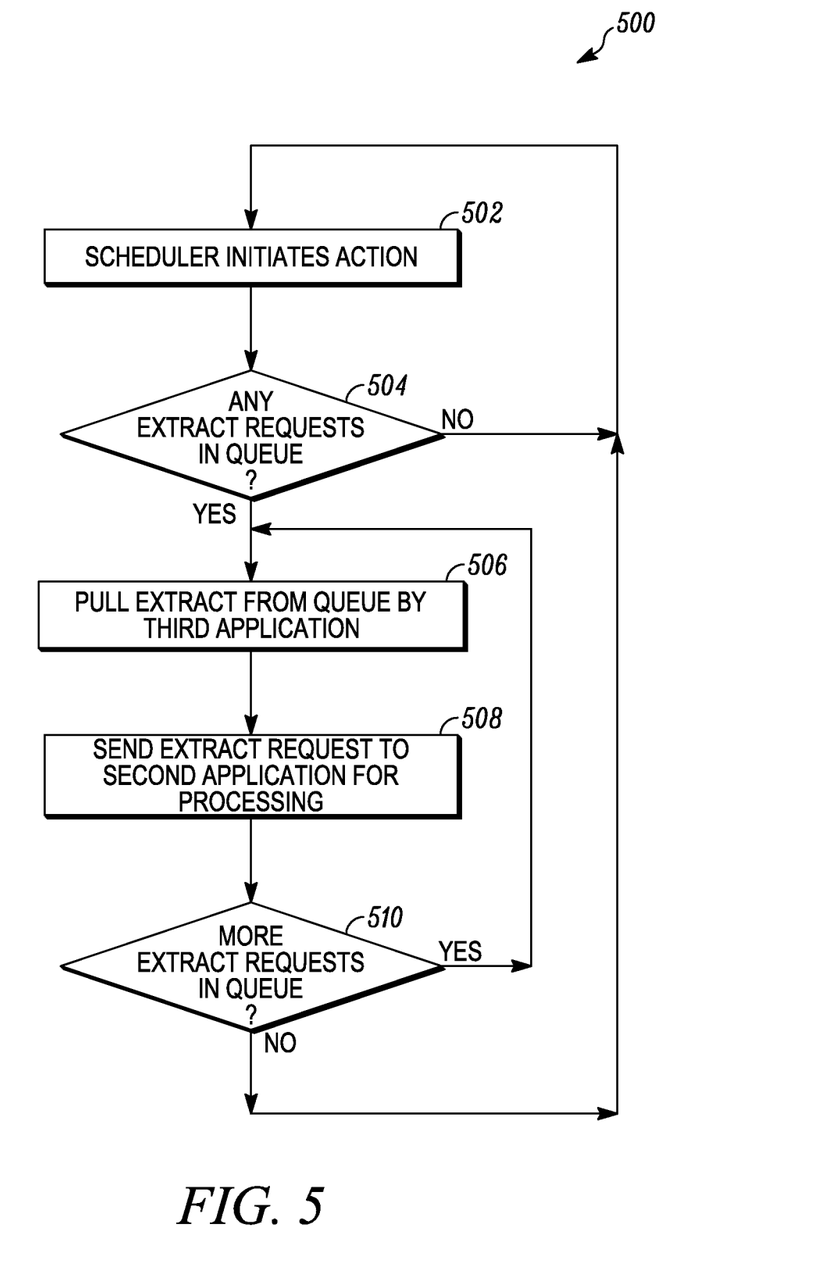
FIG. 5 is a flow chart illustrating the process of sending an extract request via a third application.

Once a job is placed in the extract queue, the job needs to be processed. FIG. 5 is a flow chart (500) demonstrating processing of an extract job by the third application. As noted above, a scheduler may be employed to facilitate review of the extract and instruction queues on a periodic basis. The scheduler sends a message to the third application indicating that based upon the time interval, the third application should check the extract queue (502). It is then determined if there are any extract requests pending in the extract queue (504). A negative response to the determination at step (504) is followed by returning to the scheduler to wait for the expiration of the next time interval to check the extract queue. Conversely, a positive response to the determination at step (504) is followed by the third application pulling an extract request from the queue (506), and sending the extract request to the second application local to the annuity management service for processing (508). In one embodiment, the extract request is communicated to the second application via a web service. A web service is a software system designed to support interoperable machine-to-machine interaction over a network. Web services are frequently internet based application program interfaces (APIs) that can be accessed over a network, such as the Internet, and executed on a remote system hosting the requested services. However, the invention should not be limited to a web service communication, as other forms of communication protocols may be employed. Following step (508), it is determined if there are any other extract requests in the extract queue (510). A positive response to the determination at step (512) is followed by returning to step (506). Conversely, a negative response to the determination at step (510) is followed by a return to step (502). Accordingly, the third application periodically reviews the extract queue for one or more extract requests.

Figure 6:
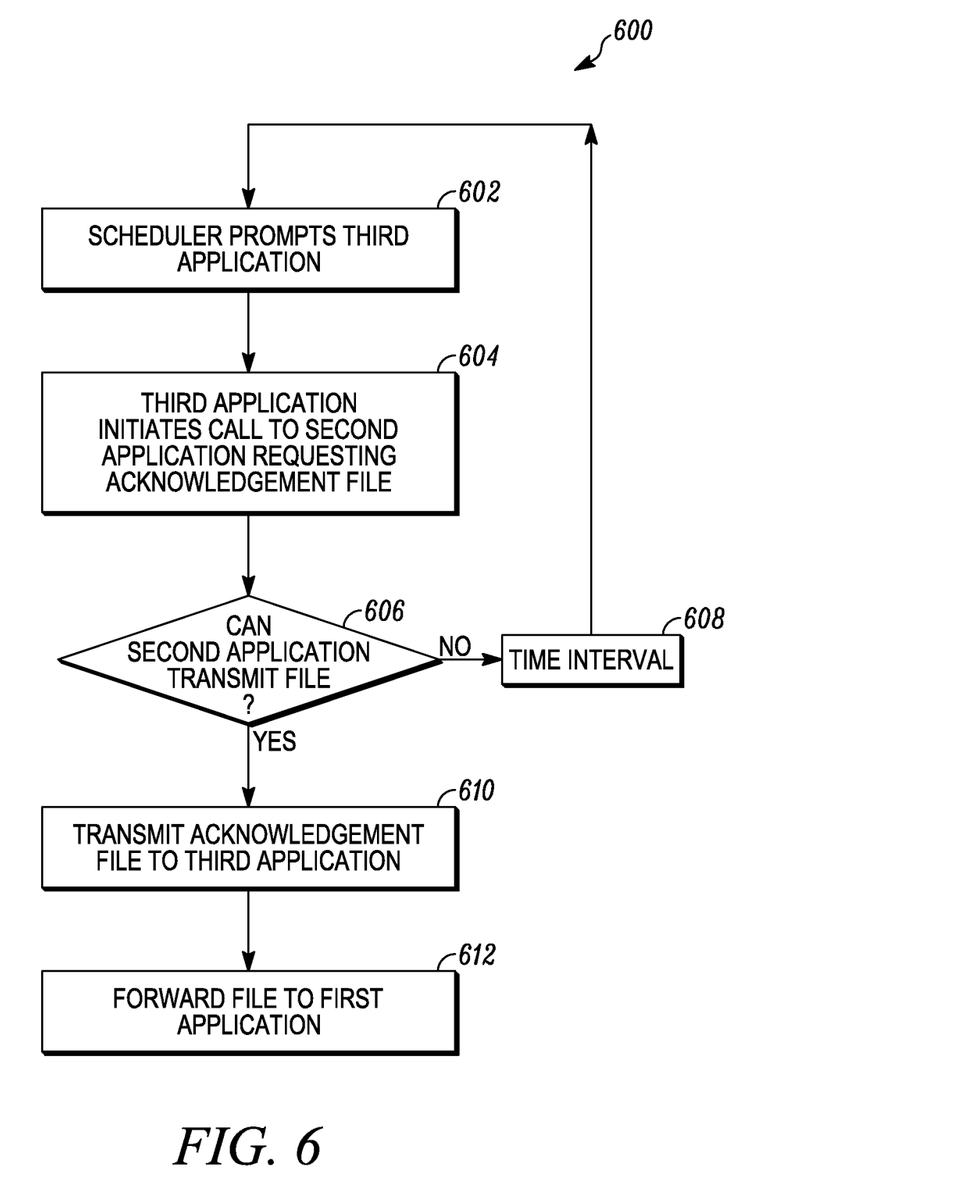
FIG. 6 is a flow chart illustrating retrieval of an acknowledgment file sent by the annuity management application.

Once an extract request has been removed from the queue, it is forwarded to the second application local to the annuity management data storage. FIG. 6 is a flow chart (600) demonstrating tracking receipt of the request by the second application. On a periodic basis, a scheduler prompts the third application to determine status of receipt of the extract request (602). Following the prompting from the scheduler, the third application initiates a call to the second application requesting an acknowledgment file indicating receipt of the extract request (604). Thereafter, it is determined if the second application is in a position to transmit the acknowledgment file (606). In one embodiment, the second application may not be prepared to transmit the acknowledgment file. If it is determined at step (606) that the second application is not in a position to transmit an acknowledgment receipt to the third application, the third application waits for a set time interval (608) and then returns to step (602). Conversely, a positive response to the determination at step (606) is followed by transmission of an acknowledgment file to the third application (610), which then proceeds to forward the acknowledgment file to the first application local to the asset management application (612). Accordingly, the third application bridges communication between the first application and the second application with respect to extract information.

Figure 7:
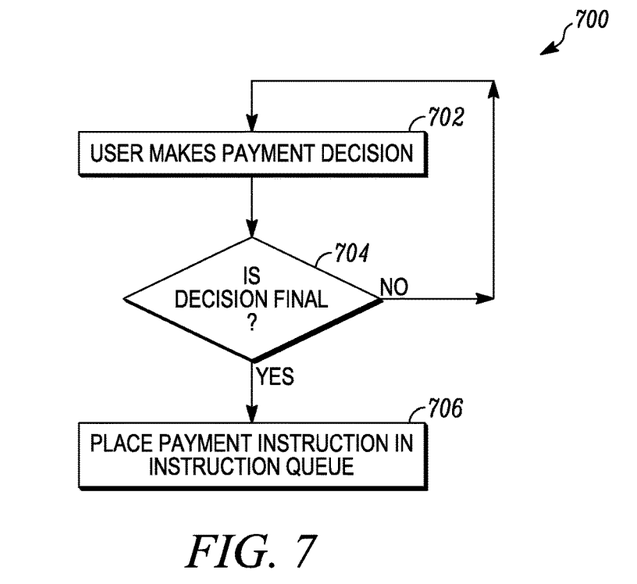
FIG. 7 is a flow chart illustrating the process of sending payment instructions from the asset management application to the annuity management application.

Once the first application has obtained the extract information from the second application, via the third application, the first application is in a position to make decision pertaining to payment of known annuity deadlines. FIG. 7 is a flow chart (700) demonstrating the logic flow for communicating annuity payment decisions from the asset management application to the annuity management application. Initially, a user in communication with the asset management application makes a decision with respect to payment of an annuity (702). It is then determined if the decision made is final (704). If it is determined that the decision was non-final and merely preliminary, then the process returns to step (702) until such time as a final decision is reached. Conversely, a positive response to the determination at step (704) is followed by the first application placing an annuity payment instruction in the instruction queue (706). As shown in FIG. 3, the instruction queue is a conduit by which the first application communication payment instructions to the third application.

Figure 8:
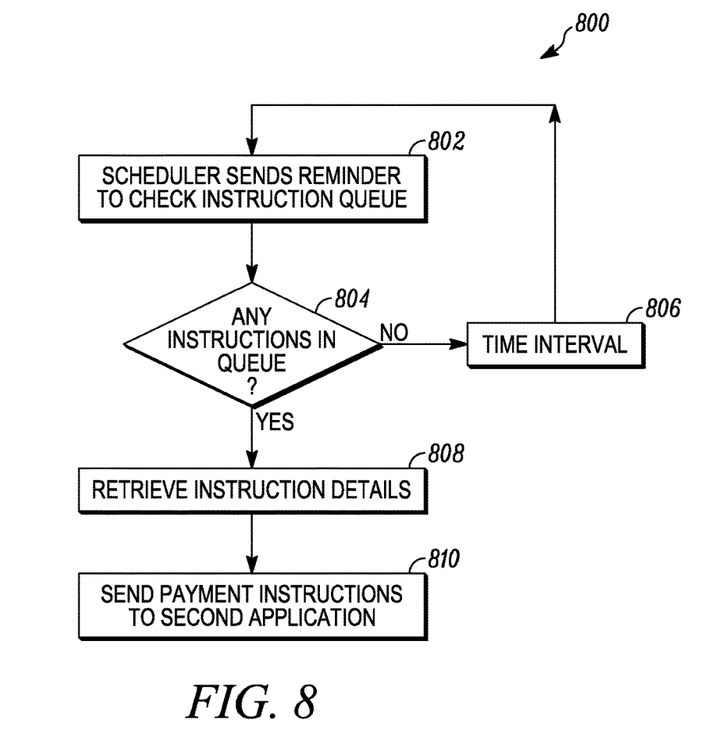
FIG. 8 is a flow chart illustrating sending instructions via the third application.

FIG. 8 is a flow chart (800) demonstrating how the payment instruction placed in the queue at step (706) is communicated to the annuity management system. In a similar manner to the extraction queue, a scheduler periodically reminds the third application to check the instruction queue to look for any instructions placed in the queue by the first application (802). Following step (802), it is determined if there are any instructions in the queue (804). A negative response to the determination at step (804) is an indication that the queue is empty. The third application then waits to a set an interval of time (806) and returns to step (802). Conversely, a positive response to the determination at step (804) is followed by the third application retrieving instruction details from the communication placed in the instruction queue (808). The third application proceeds to send the payment instructions to the second application local to the annuity management system (810). Accordingly, the communication between the third application and the second application with respect to annuity instructions follows a similar path to that of the extract information job as described earlier in FIG. 4.

Figure 9:
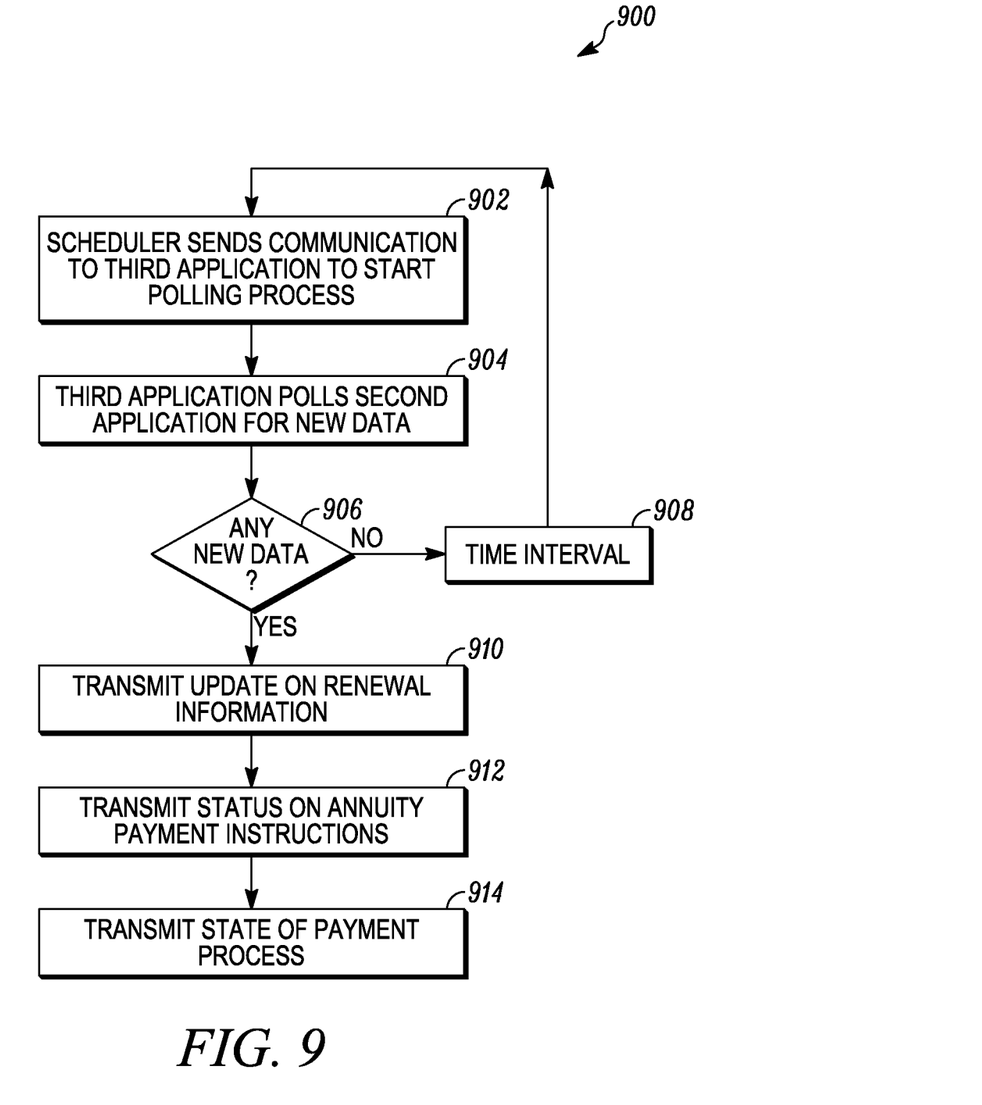
FIG. 9 is a flow chart illustrating retrieval of information from the annuity management application.

Once the instructions have been communicated to the annuity management system, the asset management system needs to receive confirmation of payment. FIG. 9 is a flow chart (900) demonstrating the process that the first application of the asset management system follows for polling the annuity management system. As in FIG. 8, a scheduler is employed to restrict the asset management system to a periodic polling schedule. At step (902), the scheduler sends a communication to the third application indicating it may start the polling process. The third application polls the second application of the annuity management system for data newer than the prior communication (904). It is recognized in the art that updates on the polling data may occur infrequently. Thereafter, it is determined if the annuity management system contains this new data (906). A negative response to the determination at step (906) is followed by waiting for a defined time interval (908), followed by a return to step (902). However, a positive response to the determination at step (906) is followed by transmission of polling data from the annuity management system to the asset management system. More specifically, the transmission includes the following information: an update on the renewal information (910), the status on the instructions for the annuity payment (912), and the state of the payment process (914). All of the data transmitted to the third application is then forwarded to the first application. In one embodiment, the polling data communicated from the annuity management system to the third application local to the asset management system is through a web service.

As shown in FIGS. 3-9, the communication between the application local to the asset management system and the application local to the annuity management system is all conducted via a web service. However, the invention should not be limited to this single form of communication transmission. In one embodiment, other transmission tools may be employed that replace or augment the web service transmission.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include a storage medium such as semiconductor or solid state memory, magnetic tape, a removable computer diskette, random access memory (RAM), read-only memory (ROM), a rigid magnetic disk, and a flash drive, an optical disk.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

An interface between an annuity management system and an asset management system that facilitates and enables automated exchange of information is provided. By employing a schedule together with the interface, the need for human interaction is mitigated, if not removed altogether. It will be appreciated that, although specific embodiments of the invention have been described herein for purposes of illustration, various modifications may be made without departing from the spirit and scope of the invention. In particular, in one embodiment the third application may be embedded local to the patent annuity application, with web service employed as a medium for communication between the third application and the patent asset management application. Similarly, in another embodiment, the third application may be embedded on a third server, remote from both the patent asset management application and the patent annuity application. The third application is in communication with both of the other applications through a network connection, and a web service is employed as a medium for communication between the third application, the patent asset management application, and the patent annuity application. Accordingly, the scope of protection of this invention is limited only by the following claims and their equivalents.

We claim:

1. A computer system comprising:
 a first server comprising a first processor in communication with a first data storage medium that stores intellectual property asset data;
 a first application that serves as an interface for said first data storage medium and is in communication with the first processor, wherein the first application is directed to docket intellectual property assets;
 a second server comprising a second processor in communication with a second data storage medium that stores annuity data;
 a second application that serves as an interface for said second data storage medium and is in communication with the second processor, wherein the second application is directed to manage the annuity data for the intellectual property assets, the second server being separate from the first server;
 a third application local to the first server and in communication with the first application via a local communication protocol and in communication with the second application via a web service, wherein the third application automatically communicates annuity related instructions and extract requests for retrieving annuity information received from the first application to the second application and the corresponding annuity related information received from the second application to the first application to enable sharing of the annuity data with the first application;
 an extraction queue that is local to the first server and accessible by the first and the third application to enable sharing of the annuity data with the first application, wherein the first application stores each of the extract requests in the extraction queue before it is communicated to the second application; and
 a scheduler that is stored in-memory with and in communication with the third application to enable sharing of the annuity data with the first application, wherein the scheduler automatically and periodically sends a message to the third application after expiration of a first time interval that causes the third application to pull the extract requests currently stored in the extraction queue and communicate the pulled extract requests to the second application, and
 wherein the scheduler automatically and periodically prompts the third application after the expiration of a second time interval to cause the third application to initiate a call to the second application requesting an acknowledgment file that indicates receipt of at least one of the pulled extract requests;
 wherein the second server is unable to share the annuity data with the first server absent the third application, the extraction queue, and the scheduler.

2. The system of claim 1, wherein the third application communicates the pulled extract requests to the second application via the web service.

3. The system of claim 1, wherein the third application receives the acknowledgment file from the second application and communicates the acknowledgment file to the first application, the annuity related information comprising the acknowledgment file.

4. The system of claim 1, further comprising an instruction queue that is local to the first server, wherein the first application stores each of the annuity related instructions in the instruction queue before it is communicated to the second application and
 wherein the scheduler periodically prompts the third application after expiration of a third time interval to cause the third application to retrieve the annuity related instructions currently stored in the instruction queue and communicate the retrieved annuity related instructions to the second application.

5. The system of claim 4, wherein the third application communicates the retrieved annuity related instructions to the second application via the web service.

6. The system of claim 4, wherein the scheduler periodically sends a communication to the third application after expiration of a fourth time interval to cause the third application to poll the second application to obtain new data relating to at least one of the retrieved annuity related instructions.

7. The system of claim 6, wherein the new data comprises a current status of the at least one of the retrieved annuity related instructions.

8. The system of claim 6, wherein the new data comprises an update on renewal information associated with the at least one of the retrieved annuity related instructions.

9. The system of claim 6, wherein the new data comprises a state of a payment process associated with the at least one of the retrieved annuity related instructions.

10. A method comprising:
    interfacing, by a processor, a first data storage medium used to store intellectual property asset data with a first application, wherein the first application is directed to docket intellectual property assets;
    interfacing, by the processor, a second data storage medium used to store annuity data with a second application, wherein the second application is directed to manage the annuity data for the intellectual property assets, the second application being separate from the first application;
    using a third application, by the processor, to communicate annuity related instructions and extract requests for retrieving annuity information received from the first application to the second application and the corresponding annuity related information received from the second application to the first application, wherein the third application is in communication with the first application via a local communication protocol and in communication with the second application via a web service to enable sharing of the annuity data with the first application;
    storing, by the processor, each of the annuity related instructions in an instruction queue before it is communicated to the second application, wherein the instruction queue is accessible by the first application and the third application to enable sharing of the annuity data with the first application;
    using a scheduler that is stored in-memory with and in communication with the third application to enable sharing of the annuity data with the first application, by the processor, to automatically and periodically prompt the third application after expiration of a first time interval to cause the third application to retrieve the annuity related instructions currently stored in the instruction queue and communicate the retrieved annuity related instructions to the second application; and
    using the scheduler, by the processor, to automatically and periodically send a communication to the third application after expiration of a second time interval to cause the third application to poll the second application to obtain new data relating to at least one of the retrieved annuity related instructions;
    wherein the second application is unable to share the annuity data with the first application absent the third application, the extract requests, and the scheduler.

11. The method of claim 10, further comprising:
    storing, by the processor, each of the extract requests in an extraction queue before it is communicated to the second application, wherein the extraction queue is accessible by the first application and the third application; and
    using the scheduler, by the processor, to periodically send a message to the third application after expiration of a third time interval that causes the third application to pull the extract requests currently stored in the extraction queue and communicate the pulled extract requests to the second application.

12. The method of claim 11, further comprising using the third application, by the processor to communicate the pulled extract requests to the second application via the web service.

13. The method of claim 11, further comprising:
    using the scheduler, by the processor, to periodically prompt the third application after the expiration of a fourth time interval to cause the third application to initiate a call to the second application requesting an acknowledgment file that indicates receipt of at least one of the pulled extract requests.

14. The method of claim 11, further comprising:
    using the third application, by the processor, to receive the acknowledgement file from the second application and communicate the acknowledgement file to the first application.

15. The method of claim 10, wherein the third application communicates the retrieved annuity related instructions to the second application via the web service.

16. The method of claim 10, wherein the new data comprises confirmation of an annuity payment associated with the at least one of the annuity related instruction.

17. The method of claim 10, wherein the new data comprises a current status of the at least one of the annuity related instructions.

18. The method of claim 10, wherein the new data comprises an update on renewal information associated with the at least one of the annuity related instructions.

19. The method of claim 10, wherein the new data comprises a state of a payment process associated with the at least one of the annuity related instructions.

* * * * *